United States Patent [19]
Adkins

[11] Patent Number: 5,975,720
[45] Date of Patent: Nov. 2, 1999

[54] COLOR CHANGER

[75] Inventor: Sean Adkins, Vancouver, Canada

[73] Assignee: Ricardo Lighting Company, Limited, Aberdeen, The Hong Kong Special Administrative Region of the People's Republic of China

[21] Appl. No.: 08/939,386

[22] Filed: Sep. 29, 1997

[51] Int. Cl.[6] ..................................................... F21V 9/00
[52] U.S. Cl. ........................... 362/293; 362/324; 362/325
[58] Field of Search .................................. 362/293, 322, 362/324, 325; 359/889, 890, 892

[56] References Cited

U.S. PATENT DOCUMENTS

| | | | |
|---|---|---|---|
| 4,392,187 | 7/1983 | Bornhorst | 362/233 |
| 4,602,321 | 7/1986 | Bornhorst | 362/268 |
| 4,958,265 | 9/1990 | Solomon | 362/293 |
| 5,060,126 | 10/1991 | Tyler et al. | 362/293 X |
| 5,186,536 | 2/1993 | Bornhorst et al. | 362/293 |

*Primary Examiner*—Stephen Husar
*Attorney, Agent, or Firm*—Anderson, Levine & Lintel, L.L.P.

[57] ABSTRACT

A color changer for use with a wide angle light source which includes a frame, a plurality of planar dichroic filter strips mounted on the frame and aligned substantially parallel to each other. The filter strips have identical predetermined optical filtering characteristics with first and second sets of the filter strips movable along a common axis so as to vary the gap between them and at least alternate ones of the filter strips in each of the first and second sets set at an angle such that, when the color changer is positioned in a beam of light transmitted from the wide angle light source, a substantially constant angle of incidence is maintained with respect to light from the light source incident on the alternate ones of the dichroic filter strips.

12 Claims, 4 Drawing Sheets

COLOR CHANGER

FIELD

The present invention relates to a colour changer for use in providing coloured lighting for theatrical, decorative and architectural purposes.

BACKGROUND

A variety of colour changers have been developed to control the colour of light transmitted from a source. Such devices are used widely to provide theatrical, decorative and architectural lighting.

Conventional colour changers make use of dichroic filters to vary the colour of light transmitted from a source. Dichroic filters reflect selected wavelengths while transmitting other wavelengths thereby allowing one to produce a desired colour. For example, U.S. Pat. No. 4,392,187, issued Jul. 5, 1983 to Bornhorst, discloses a system for varying the transmitted colour from a light source using four aligned dichroic filters within the path of the light beam. Each filter is pivotable so as to vary the angle of incidence of the light falling upon the filter, thereby varying the wavelength of light transmitted. In U.S. Pat. No. 4,602,321, issued Jul. 22, 1986 to Bornhorst, sets of overlapping dichroic filters are aligned in a light source. Each filter is rotatable around an axis so as to vary the angle of incidence which, in turn varies the hue and saturation of the filtered light beam, thereby producing a range of colours with a limited number of filters.

While the prior art systems provide useful mechanisms for varying the colour of light produced with a light source, they are not well suited for use with wide angle light sources, such as with floodlights. When a flood light or other light source with a wide area of coverage is used with a dichroic filter, the angle of incidence of light falling on the filter varies across the face of the filter. It is well known that wavelength of light transmitted by a dichroic filter is a function of the angle of the incident beam to the normal at the point of incidence. As discussed above, prior art colour changers make use of this principle to produce a variety of colours using only a few filters. In such conventional devices, however, the area provided by the filters for receiving a light beam is comparatively small and the rays of light from the source must be directed towards the filters in an orientation substantially parallel with a longitudinal axis of the light source. This arrangement is not suitable for wide angle coverage.

In order to produce a desired distribution of light conventional devices rely on a system of lenses positioned after the filters and in the path of the filtered beam. However, when designing a light source with a wide area of coverage, it is desirable to avoid the complexity and cost of lenses and to rely entirely on a reflector that produces the required distribution of light. A number of such wide coverage light sources are commonly made and come in a variety of shapes. As these light sources do no use lenses, colour filters for such sources must cover a large area equal at least to the size of the face of the reflector. Moreover, as wide coverage light sources are very bright, a non-absorbing dichroic filter is necessary to provide a low maintenance colour medium.

Accordingly, it is an object of the invention to provide an improved colour changer which can be used with a light source to cover a large area and provide at the same time improved uniformity of colour.

SUMMARY OF THE INVENTION

According to the present invention there is provided a colour changer for use with a wide angle light source which includes a frame, a plurality of planar dichroic filter strips mounted on the frame and aligned substantially parallel to each other. The filter strips have identical predetermined optical filtering characteristics with first and second sets of the filter strips movable along a common axis so as to vary the gap between them and at least alternate ones of the filter strips in each of the first and second sets set at an angle such that, when the colour changer is positioned in a beam of light transmitted from the wide angle light source, a substantially constant angle of incidence is maintained with respect to light from the light source incident on the alternate ones of the dichroic filter strips.

The colour changer may be dimensioned to extend at least substantially across the width of a beam of light emerging from the wide angle light source proximate to the light source.

A diffuser may be positioned adjacent the colour changer so as to intercept light rays passing through the colour changer and to cause mixing of the light rays.

The dichroic filters may be disposed with respect to each other such that edges of adjacent filter strips adjoin and the strips form a saw tooth pattern in cross section.

The dichroic filters may be elongated rectangular strips of glass covered with a dichroic coating.

An angle of inclination of the dichroic filter strips with respect to a plane through a face of the colour changer gradually increases from a minimum inclination for filter strips nearest to a centre of the colour changer to increasing inclinations for each successive filter strip as one proceeds away from the centre in either of two opposite directions to a maximum inclination for filter strips proximate outer edges of the colour changer.

Advantageously, the filter strips may be moveable to provide a variable gap between alternate ones of the filter strips.

The first and second sets of filter strips may be mounted in a first and second frame set, respectively, and including a lead screw threadedly coupled to each of the frame sets operative to reversibly move the first and second frame sets away from a centre of the colour changer at an equal rate.

According to another aspect of the invention there is provided a method of filtering light emitted from a wide angle light source with a colour changer having a plurality of dichroic filter strips which filter the light to produce substantially uniform colours. The method comprises the steps of positioning the colour changer so as to intersect a beam of the light from the wide angle light source and orienting the dichroic filters with respect to the beam of light such that a substantially constant angle of incidence is maintained for light incident on each of a plurality of the dichroic filters so as to cause a substantial amount of light transmitted through the colour changer to have a similar colour.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION WITH REFERENCE TO THE DRAWINGS

Figure 1:
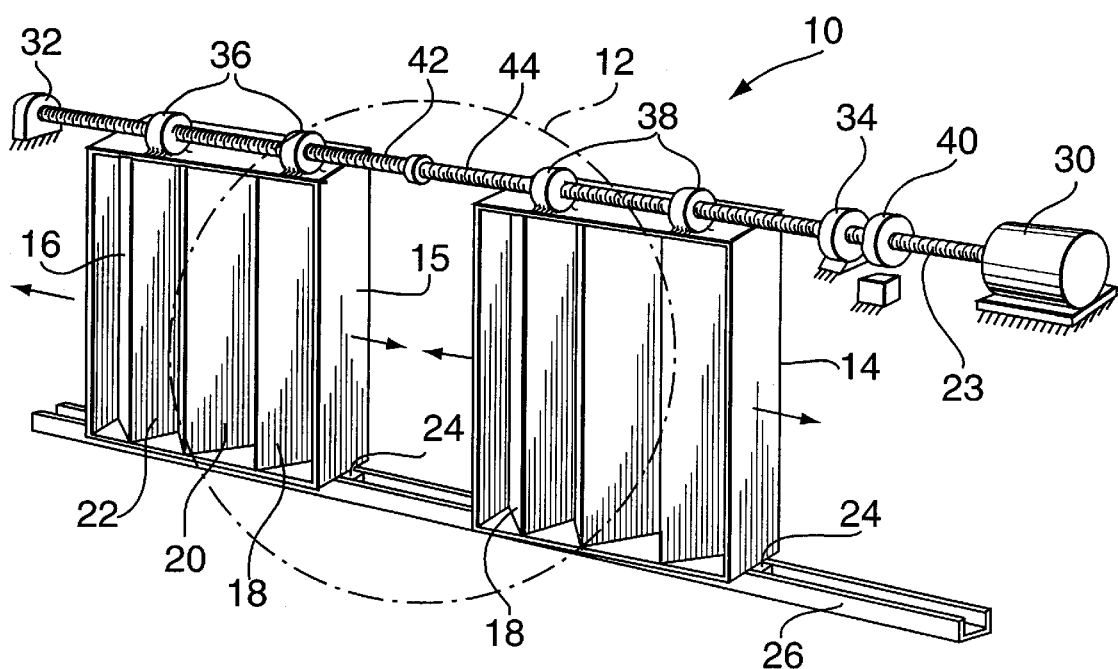
FIG. 1 is a perspective view of a colour changer with a pair of movable panels with each panel containing rectangular dichroic filter strips with each filter strip of a fixed but different angular orientation than adjacent filters.

It will be understood that in the figures which are discussed in the detailed description below, like numbers refer to like parts. Referring to FIG. 1 a light source 12 represented schematically in dotted outline casts a beam onto a colour changer 10 consisting of a series of adjacent dichroic filter strips 16 mounted in a pair of panel frames 14 and 15. The frames 14 and 15 are each suspended by leadscrew nuts 36 and 38, respectively, affixed to the top of the frames and threaded onto a leadscrew 28. The leadscrew is divided into a portion 42 having a left-handed thread and a portion 44 having a right-handed thread. The lead screw rotates within bearings 32 and 34 and its angular position is recorded by a rotary optical encoder 40. Motor 30, mounted at one end of the leadscrew, drives the leadscrew 28 either clockwise or counterclockwise so as to cause the panels 14 and 15 to approach each other or to separate. The bottom of the panels 14 and 15 have blocks 24 which slide in rail 26. The entire assembly may be tilted so that the individual dichroic filter strips 18, 20, and 22 in each panel 14 and 15 are either vertical or horizontal. (Note that reference number 16 is a general reference to all filter strips whereas other reference numbers such as 18, 20 and 22 refer to specific filter strips). Several such filter and drive assemblies may be placed in front of the light source to provide multiple colours. Moreover, the filter strips may be selected to provide subtractive or additive colour mixing when more than one filter strip is used in combination.

Figure 2:
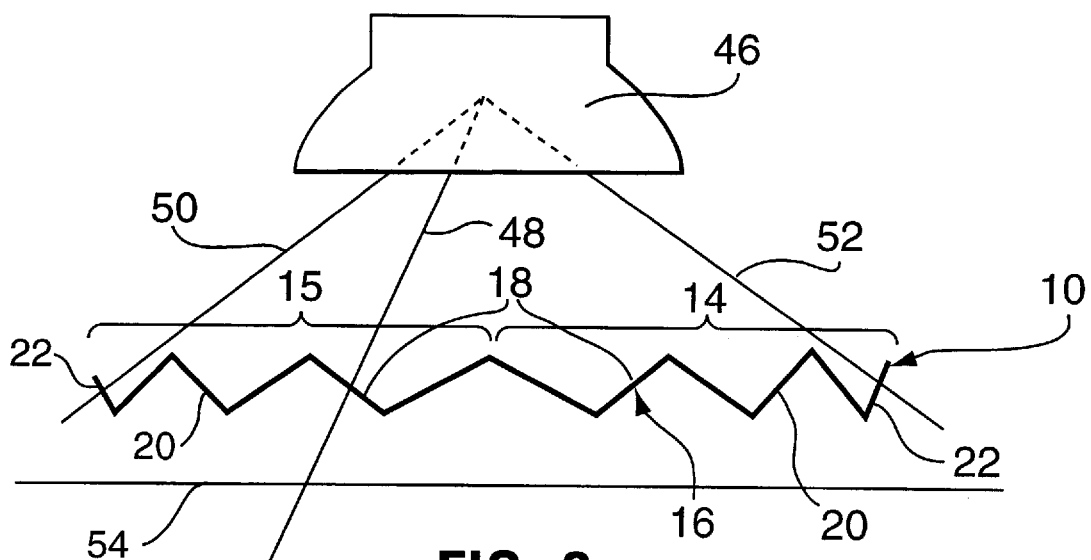
FIG. 2 is a top view of a light source used with the colour filter of FIG. 1.

Referring to FIG. 2, a fully closed colour changer 10 is positioned in front of a light source 46 which casts a wide angle of light the outer extremities of which are represented by rays 50 and 52. The filter strips 18 are less inclined with respect to a plane of the colour changer 10 than filter strips 20, and filter strips 20 are less inclined to the plane of the colour changer 10 than are filter strips 22. This varying orientation of the filter strips results in each filter strip being approximately normal to the direction of incidence of a central ray of light such as ray 48 from the light source 46. The number and width of the filter strips may be varied to suite the application and maintain the desired degree of uniformity.

When the light source 46 and the colour changer 10 are close to the object to be illuminated (not shown), it is desirable to ensure mixing of the rays especially at the intersection of the filter strips 16. For this purpose a light diffuser 54 may be placed in front of the source 46 and colour changer 10.

Figure 3:
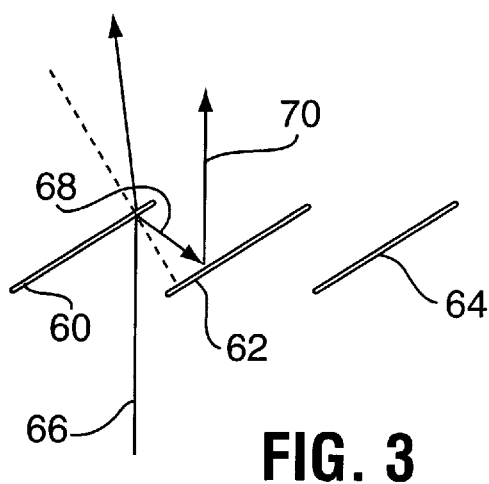
FIG. 3 is a top view of dichroic filter strips which are all oriented in the same angular direction showing light reflected from the filter strips.

The filter strips 60, 62 and 64 may be inclined in the same direction at varying angles as shown in FIG. 3 but such a configuration has an inherent problem of light being reflected from one filter strip onto another. For example, light ray incident on dichroic filter strip 60 is reflected as shown by ray 68 onto filter strip 62. A further reflection as shown by ray 70 by filter strip 62 results in the unwanted light beam traveling towards the object to be illuminated.

Figure 4:
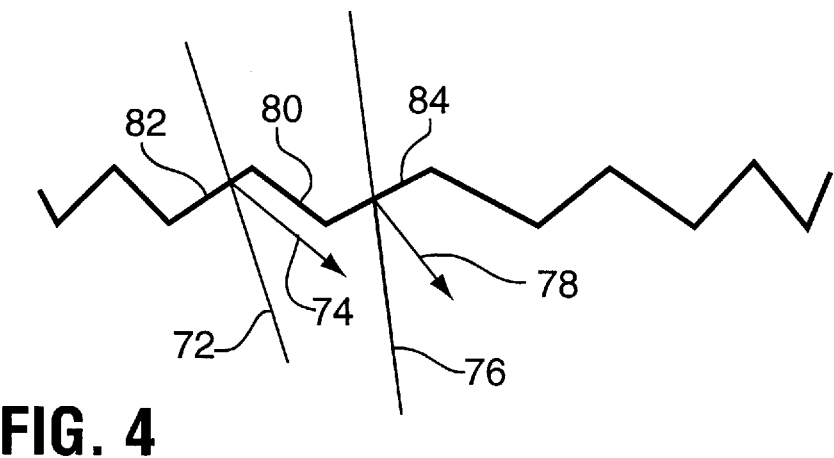
FIG. 4 is a top view of a colour changer with adjacent dichroic filters oriented at angle θ and 180°-θ, respectively, showing two different light paths of light reflected from the filter strips.

As shown in FIG. 4, with the filter strips 80, 82 and 84 being placed at varying angles plus or minus 180 degrees light as represented by rays 72 and 76 are reflected as shown by rays 74 and 78 without impinging on the interconnecting filter panel 80. The latter configurations minimizes the effect of light reflected from one strip onto another and onto successive layers of filter strips.

Figure 5:
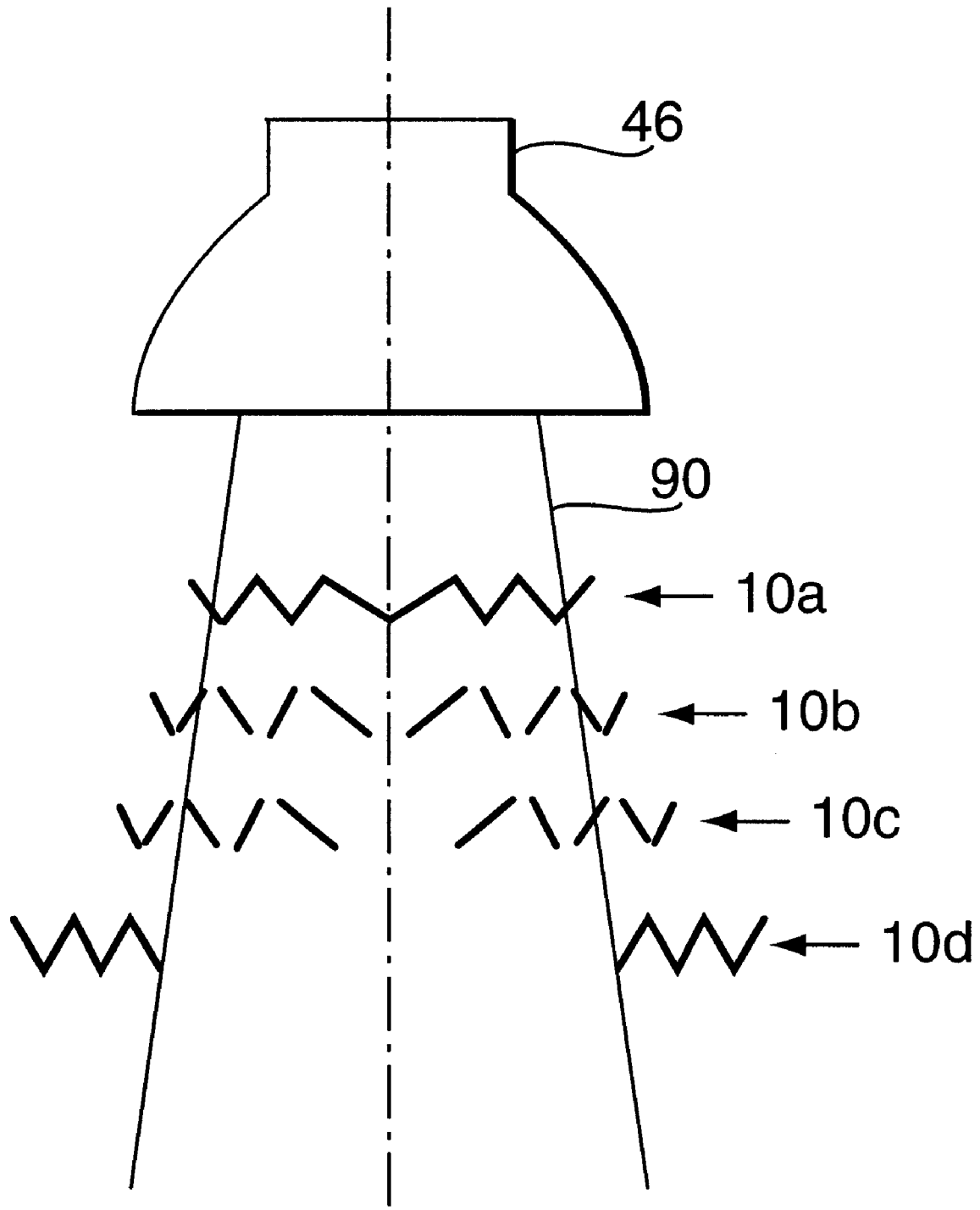
FIG. 5 is top view showing the colour filter of FIG. 1 with the two panels in various positions and varying numbers of dichroic filter strips interposed in the light beam and various spacings between the filter strips.

Referring to FIG. 5, four colour changers 10a, 10b, 10c, and 10d are shown in various configurations. Colour changer 10a is fully closed and in front of the beam 90. Colour changers 10b and 10c have varying numbers of filter strips 16 in front of beam 90 with varying gaps between the filter strips. The spacing of the dichroic filter strips provides a greater range of colour variation. Colour changer 10d is fully open with no filter strips in front of the beam 90.

Figure 6:
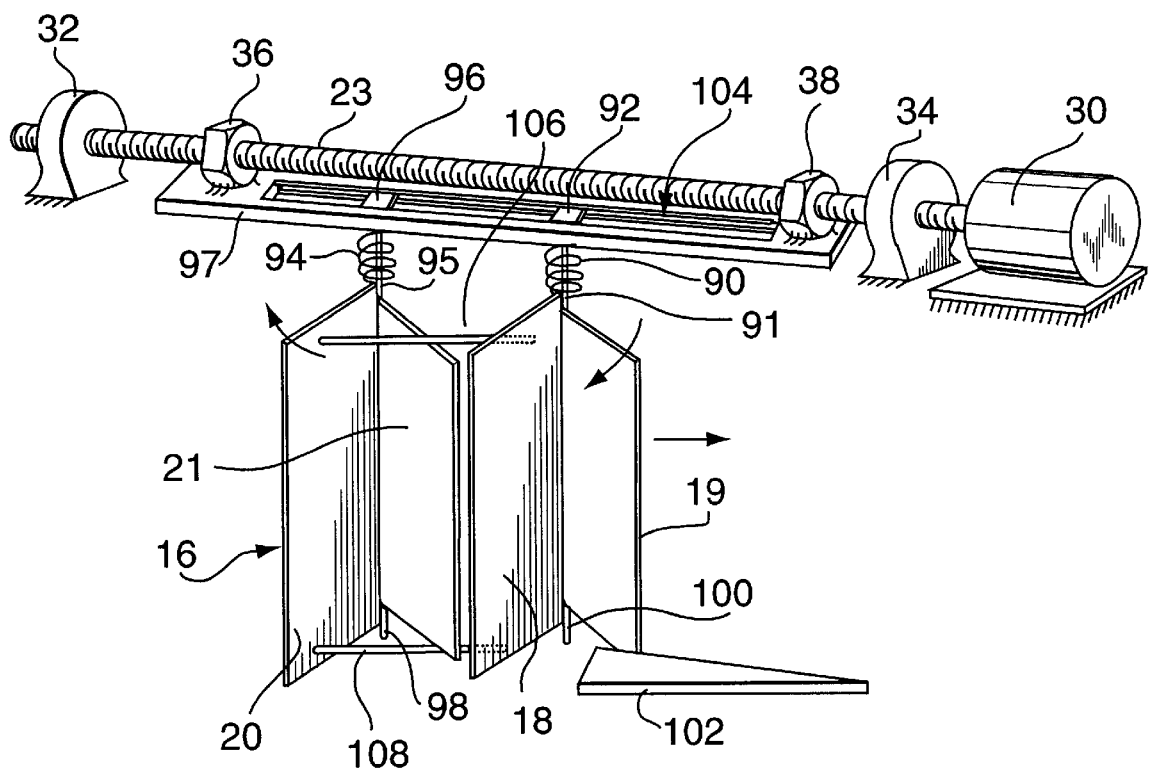
FIG. 6 is a perspective view of a portion of a frame set showing automatic rotation of the filter strips.

Referring to FIG. 6, a frame set assembly which results in automatic rotation of the filter strips 16 has a top frame member 97 with an elongation slot having a shoulder so as to provide vertical support to the slider lugs 92 and 96 to which there are journaled shafts 91 and 95. Shafts 91 and 95 are affixed to filter strips 18 and 19 and 20 and 21. Torsion springs 90 and 94 are mounted around shafts 91 and 95, respectively, tensioning the filter strip 19 against a sloped block 102 which is coupled to a fixed portion of the frame. Filter strip 18 which is rigidly coupled to filter strip 19 along adjoining edges of each has rods 106 and 108 affixed thereto. Rods 106 and 108 pass over and under, respectively filter strip 21 and contact filter strip 20. As the frame set associated with filter strips 18, 19, 20 and 21 moves towards the center shown by the arrow, torsion spring 90 causes filter strip 19 to rotate in the direction shown. The rotation of rods 106 and 108 causes filter strip 20 and, hence, filter strip 21 to rotate in the same direction.

More complex mechanical arrangements allow for the varying lateral movement of filters 18 and 19 relative to filters 20 and 21 in addition to the automatic rotation as described above. For example, corresponding filter pairs in each frame set may be individually driven by separate lead screw assemblies.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A colour changer for use with a wide angle light source, comprising:

a frame;

a plurality of planar dichroic filter strips mounted on said frame and aligned substantially parallel to each other, said filter strips having identical predetermined optical filtering characteristics, first and second sets of said filter strips movable along a common axis so as to vary the gap between said first and said second set of filter strips and at least alternate ones of said filter strips in each of said first and second sets set at an angle such that when said colour changer is positioned in a beam of light transmitted from said wide angle light source a substantially constant angle of incidence is maintained with respect to light from said light source incident on said alternate ones of said dichroic filter strips.

2. A colour changer according to claim 1, wherein said colour changer is dimensioned to extend at least substantially across the width of a beam of light emerging from said wide angle light source proximate to said light source.

3. A colour changer according to claim 1, including a diffuser positioned adjacent said colour changer so as to intercept light rays passing through said colour changer and cause mixing of the light rays.

4. A colour changer according to claim 1, wherein said dichroic filters are disposed with respect to each other such that edges of adjacent filter strips adjoin and said strips form a saw tooth pattern in cross section.

5. A colour changer according to claim 1, wherein said dichroic filters comprise of elongated rectangular strips of glass covered with a dichroic coating.

6. A colour changer according to claim 1, wherein an angle of inclination of said dichroic filter strips with respect to a plane through a face of said colour changer gradually increases from a minimum inclination for filter strips nearest to a centre of said colour changer with increasing inclinations for each successive filter strip as one proceeds away from the centre in either of two opposite directions to a maximum inclination for filter strips proximate outer edges of said colour changer.

7. A colour changer according to claim 1, wherein said dichroic filter strips are moveable to provide a variable gap between alternate ones of said filter strips.

8. A colour changer according to claim 1, wherein said first and second sets of filter strips are mounted in a first and second frame set, respectively, and including a lead screw threadedly coupled to each of said frame sets operative to reversibly move said first and second frame sets away from a centre of said colour changer at an equal rate.

9. A colour changer according to claim 5, wherein said dichroic filter strips are aligned along an axis parallel to their respective long sides.

10. A colour changer for use with a wide angle light source, comprising:
   a track;
   a pair of frame sets having guide blocks affixed thereto along bottom edges of each of said frame sets slidable in said tracks;
   a plurality of rectangular, planar dichroic filter strips rotatably mounted on each of said frame sets and aligned substantially parallel to each other along their long sides, said filter strips having identical predetermined optical filtering characteristics, said frame sets movable along said tracks so as to vary the gap between said first and said second set of filter strips and at least alternate ones of said filter strips in each of said first and second sets set at an angle such that when said colour changer is positioned in a beam of light transmitted from said wide angle light source a substantially constant angle of incidence is maintained with respect to light from said light source incident on said alternate ones of said dichroic filter strips;
   a cam block contacting one of said filter strips, said cam block shaped to cause said one filter strip to rotate upon translational movement away and towards a center of said colour changer and an abutment affixed to said one filter strip and contacting an adjacent filter strip independently rotationally mounted in said frame set such that rotation of said one filter strip in a first direction causes rotation of said adjacent filter strip in the first direction and abutments on each subsequent filter strip contacting a further adjacent independently rotationally mounted filter strip so as to cause rotation of the further adjacent filter strip in the same direction as and in response to rotation of the subsequent filter strip;
   a torsion spring coupled to said filter strips so as to bias said one filter strip against said cam block and said adjacent filter against said one filter strip;
   a plurality of threaded nuts affixed to tops of said frame sets;
   a lead screw threadedly engaging said threaded nuts with threads oriented so that said frame sets move apart and together upon rotation of said lead screw in respective first and second directions of rotation; and
   a motor coupled to said lead screw operative to cause rotation of said lead screw.

11. A colour changer for use with a wide angle light source, comprising:
   a frame;
   a plurality of dichroic filter strips aligned with each other in a first direction and capable of transmitting light having a predetermined optical characteristic, said dichroic filters slidably coupled to said frame; and
   a filter mover operative to move said dichroic filters into at least a first and second arrangement,
   wherein in said first arrangement:
      said dichroic filters are arranged on said frame so that when said colour changer is positioned in front of said light source, said filter intersects a beam of light emitted from said wide angle light source such that a substantially constant angle of incidence is maintained for the light falling on each of a plurality of said dichroic filter strips; and
   wherein in said second arrangement:
      said dichroic filters are substantially removed from the beam of light emitted from the wide angle light source.

12. A method of filtering light emitted from a wide angle light source with a colour changer having a plurality of dichroic filter strips which filter light from said light source to produce substantially uniform colour, the method comprising the steps of:
   positioning said colour changer so as to intersect a beam of the light from said wide angle light source; and
   orienting said dichroic filters with respect to the light such that a substantially constant angle of incidence is maintained for light incident on each of a plurality of said dichroic filter strips so as to cause a substantial amount of light transmitted through said colour changer to have a similar colour.

* * * * *